US005273264A

United States Patent [19]

Chen

[11] Patent Number: 5,273,264

[45] Date of Patent: Dec. 28, 1993

[54] PNEUMATIC QUICK VISE

[75] Inventor: Rong-Shiou Chen, Taichung, Taiwan

[73] Assignee: Safeway Machinery Industry Corp., Taichung, Taiwan

[21] Appl. No.: 992,726

[22] Filed: Dec. 18, 1992

[51] Int. Cl.⁵ .............................................. B23Q 3/08

[52] U.S. Cl. ....................................... 269/32; 269/136

[58] Field of Search ..................... 269/136, 138, 20, 27, 269/32, 282, 244, 248, 283, 280; 92/59, 13.8, 146, 128; 74/110

[56] References Cited

U.S. PATENT DOCUMENTS 4,934,676 6/1990 Feistenauer et al. ............... 269/136
4,949,943 8/1990 Bernstein ............................. 269/32
4,973,033 11/1990 Sun ...................................... 269/32
5,098,073 3/1992 Lenz .................................... 269/136
5,114,126 5/1992 Yasue .................................. 269/32

*Primary Examiner*—Robert C. Watson
*Attorney, Agent, or Firm*—Bacon & Thomas

[57] ABSTRACT

A pneumatic quick vise utilizes a compressed air source to control operation of its jaws for high speed clamping and releasing of working pieces at high efficiency. The vice include a piston operated by the compressed air source to drive a booster mechanism and driving a screw rod to operate the vice, and the vice further includes a pivot for its movable jaw at a reactive side to prevent upward raising of a working piece during clamping and a cushion arrangement at both sides of the piston to minimize impact from quick displacement of the piston in order to prolong service life and improve machining accuracy.

4 Claims, 5 Drawing Sheets

PNEUMATIC QUICK VISE

BACKGROUND OF THE INVENTION (a) Field of the Invention

The present invention relates to a pneumatic quick vise, particularly a bench vise operated by compressed air and incorporated with a booster mechanism to provide high clamping, high productivity force with low trouble possibility.

(b) Description of the Prior Art

Conventionally a screw rod is used to drive a movable jaw in a the conventional vise to displace the movable jaw for clamping purpose. As the clamping force so achieved is limited, an hydraulic vise was developed to provide a higher clamping force. However, displacement is slow in both the conventional manual and hydraulic vises, and neither of them can satisfy the requirement of automatic and high efficient operation today. Moreover, oil leakage may occur at the hydraulic vise, it is impossible to replenish hydraulic oil for closed type cylinder types. In addition, a working piece tends to raise up in the conventional vise for the pivot of its movable jaw is at the same point for application of force, and consequently machining accuracy is affected, it is not suitable for automatic process requiring high efficiency and high precision.

SUMMARY OF THE INVENTION

The main objective of the present invention is to provide a high speed vise operated by compressed air with high clamping force at high efficiency.

Another objective of the present invention is to provide a high speed vise with compressed air as an energy source instead of hydraulic oil to eliminate all possible pollution which often happens in use of hydraulic oil.

Another objective of the present invention is to provide a high speed vise with a locker mechanism to provide a main screw for the movable jaw at the reactive side, i.e., at the movable jaw inside lock down jaw mechanism in order to eliminate upward raising of a working piece which may adversely affect precision of machining.

Another objective of the present invention is to provide a high speed vise with a booster mechanism to provide a boosting effect with two slant surfaces for the maximum clamping force.

DETAILED DESCRIPTION OF THE PREFERRED EMBODIMENT

Figure 1:
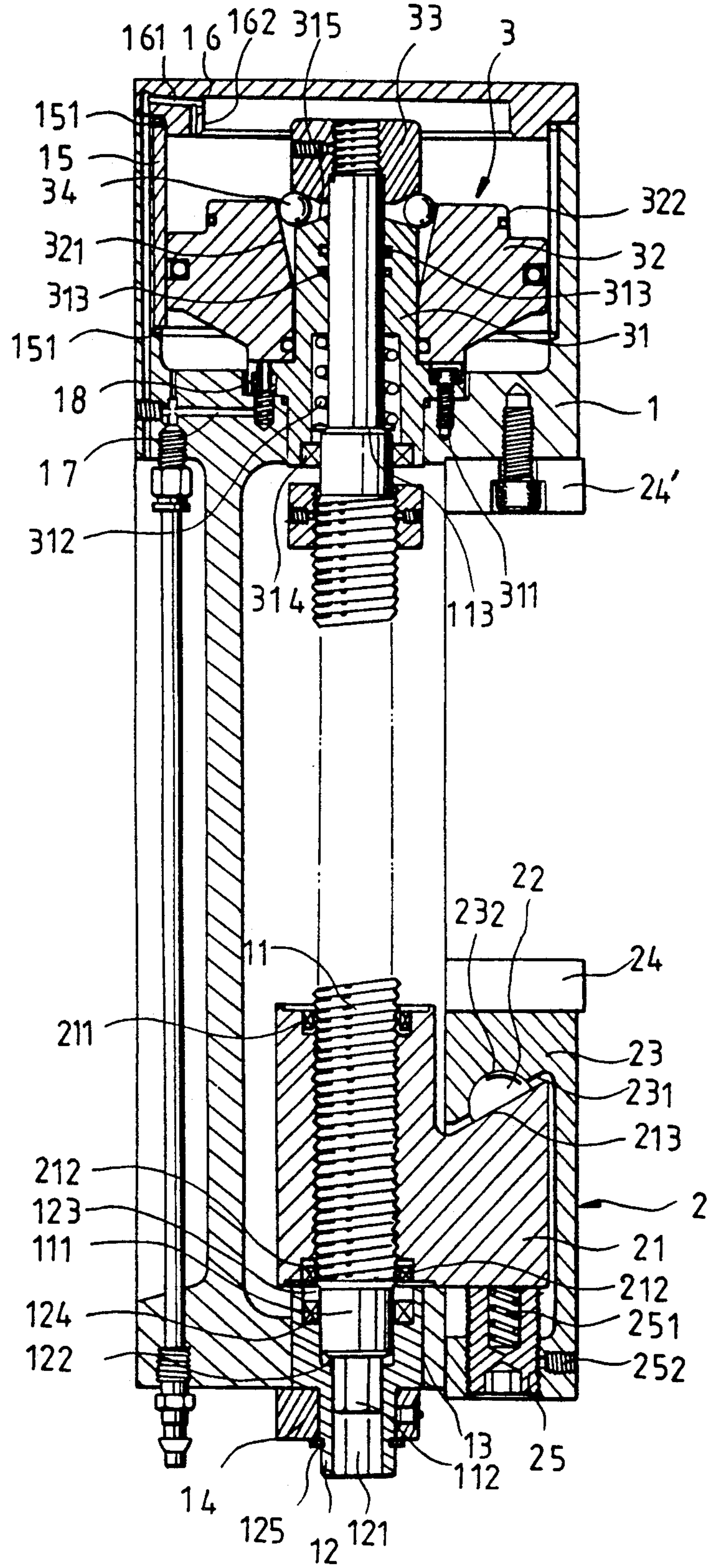
FIG. 1 is a sectional view illustrating an assembly of the pneumatic quick vise according to the present invention.

As shown in FIG. 1, the pneumatic quick vise according to the present invention comprises mainly a vise body 1, a locker mechanism 2, and a pneumatic booster mechanism 3.

The vise body 1, as shown in FIG. 1, is a basic structure of the vise to incorporate with other components, including the lock down jaw mechanism 2, the pneumatic booster mechanism 3, and all the air hoses related. The lock lock down jaw mechanism 2 is fitted to the right side of the vise body 1 to serve as a movable jaw, and the pneumatic booster mechanism 3 is fitted to the left side of the vise body 1 to serve as a fixed jaw. By connecting the movable jaw and the fixed jaw with a screw rod 11, the movable jaw can be displaced longitudinally by turning of the screw rod 11. The right end of the screw rod 11 is formed as a cylindrical post 111, from which a hexagonal post 112 is extended for fixing of a handle sleeve 12 to the right end of the screw post 11. The handle sleeve 12 is a stepped cylindrical structure with its inner wall designed corresponding to the right end of the screw rod 11. It has an inner hexagonal hole and two stepped round holes 122 and 123. The stepped round hole 123 is for fitting of a seal 124 to prevent from invasion of dust which may affect the accuracy of the present invention. The other stepped round hole 122 is designed to hold the cylindrical post 111 in order to support the screw rod 11 so as to permit axial displacement of the screw rod 11 while the hexagonal post 112 is placed within the hexagonal hole 121 for transmission of turning force applied to the screw rod 11 for the axial displacement. After insertion of the handle sleeve 12 into a round hole 13 formed on the vise body 1, a fixing plate 14 is used to secure the handle sleeve 12. The fixing plate 14 is a rectangular plate, both ends of which are locked to the vise body 1 by means of bolts to prevent the handle sleeve 12 from extending out of the vise body 1. A retaining ring 141 is fitted to an annular groove around the handle sleeve 12 outside the fixing plate 14 to prevent from retraction of the handle sleeve 12 into the vise body 1. The left side of the vise body 1 is formed as a fixed jaw. The vise nead is designed with a jaw plate 24' to clamp working piece. The vise head is a hollow structure backed by a cylinder sleeve 15. Each end of the cylinder sleeve 15 is fitted with a seal O-ring 151 to keep airtight. The opening of the hollow structure is locked with a cover 16 to become an airtight chamber. Two air passages 161 of different inner diameters are formed at the cover 16 at the left side of the airtight chamber, an end of each of the passages 161 is connected to a compressed air source, while another end is connected to the airtight chamber. Another two air passages 17 of different inner diameters are formed at the right side of the airtight chamber, an end of each of the passages 17 is connected to a compressed air source, while another end is connected to the airtight chamber.

Figure 2:
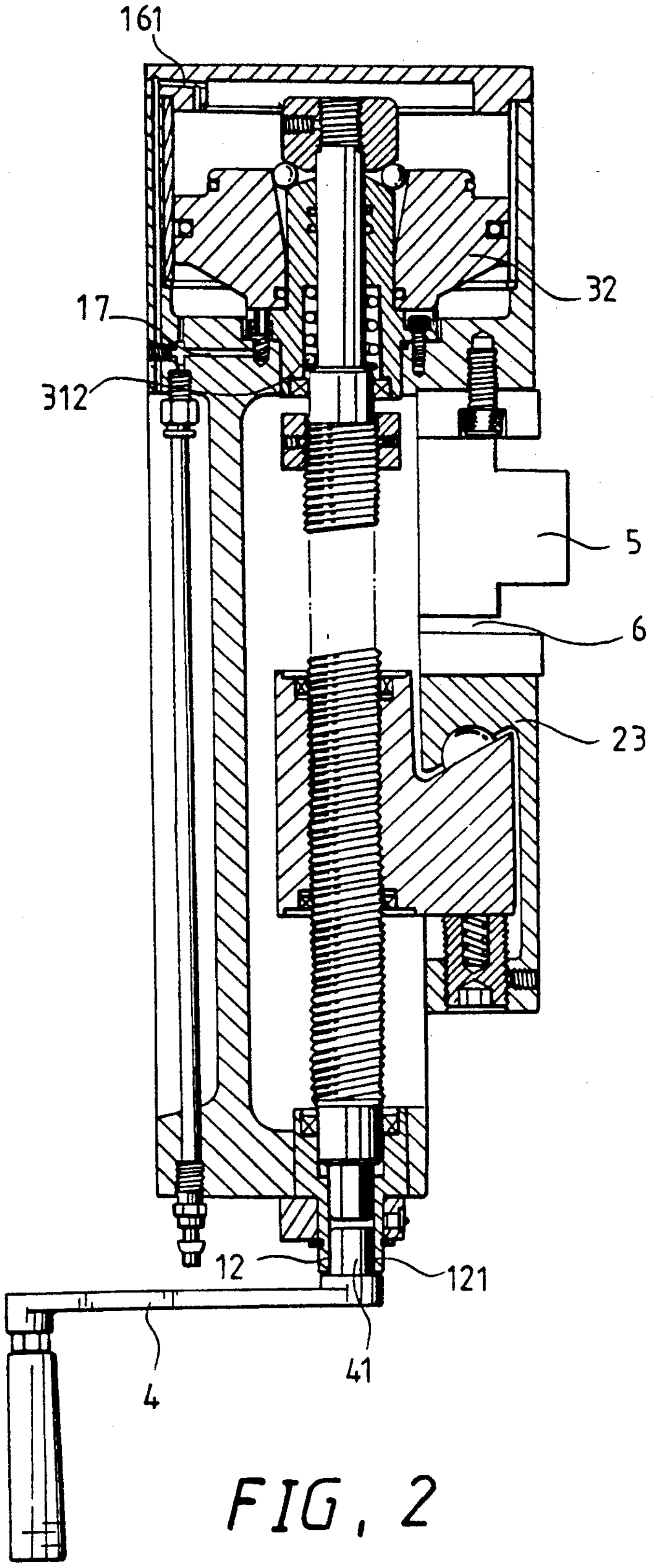
FIG. 2 illustrates operation of the movable jaw with a rocking handle in the high speed pneumatic vise according to the present invention for adjusting workpiece size.

The locker down jaw mechanism 2, as shown in FIG. 2, serves as the movable jaw at the right side of the vise body 1. It is assenibly to a threaded section of the screw rod 11 by means of a lock down jaw body 21 formed with a threaded portion corresponding to the screw rod 11 so that the lock down jaw body 21 can be feed axially upon turning of the screw rod 11. Each end of the threaded hole at the lock down jaw body 21 is fitted with a seal 211 or 212 to prevent from invasion of dust. The lock down jaw body 21 is formed with a slant plan 213, which is incorporated with a semi-sphere segment 22 to get contact with the movable jaw 23 for transmission of force. An inner wall of the movable jaw is formed with a slant plan 213 and a recession 232 corresponding to the slant plan 213 and semi-sphere segment 22 for transmission of force. The movable jaw 23 has a vertical plan on its left end for connecting to a jaw plate 24. A set screw 25 incorporated with a spring 252 in the middle is used to at the right end of the movable jaw 23 to secure the movable jaw 23 in place in a way that the set screw 25 is pushing the right end of the lock down jaw body 21 and consequently the lock down jaw body 21 and the semi-sphere segment 22 are maintained close contact with the movable jaw 23 so that they are all positioned effectively. Even if the retaining ring 25 becomes loose, the tension of the spring 252 can continue to push the lock down jaw body 21 to maintain a close contact with the movable jaw 23. The retaining ring 25 is positioned by a fixing screw 252 from the top of the movable jaw 23. The locker mechanism 2 with the structure described above can effectively eliminates jaw lift and workpiece tilt of any working piece being clamped during operation.

Figure 3:
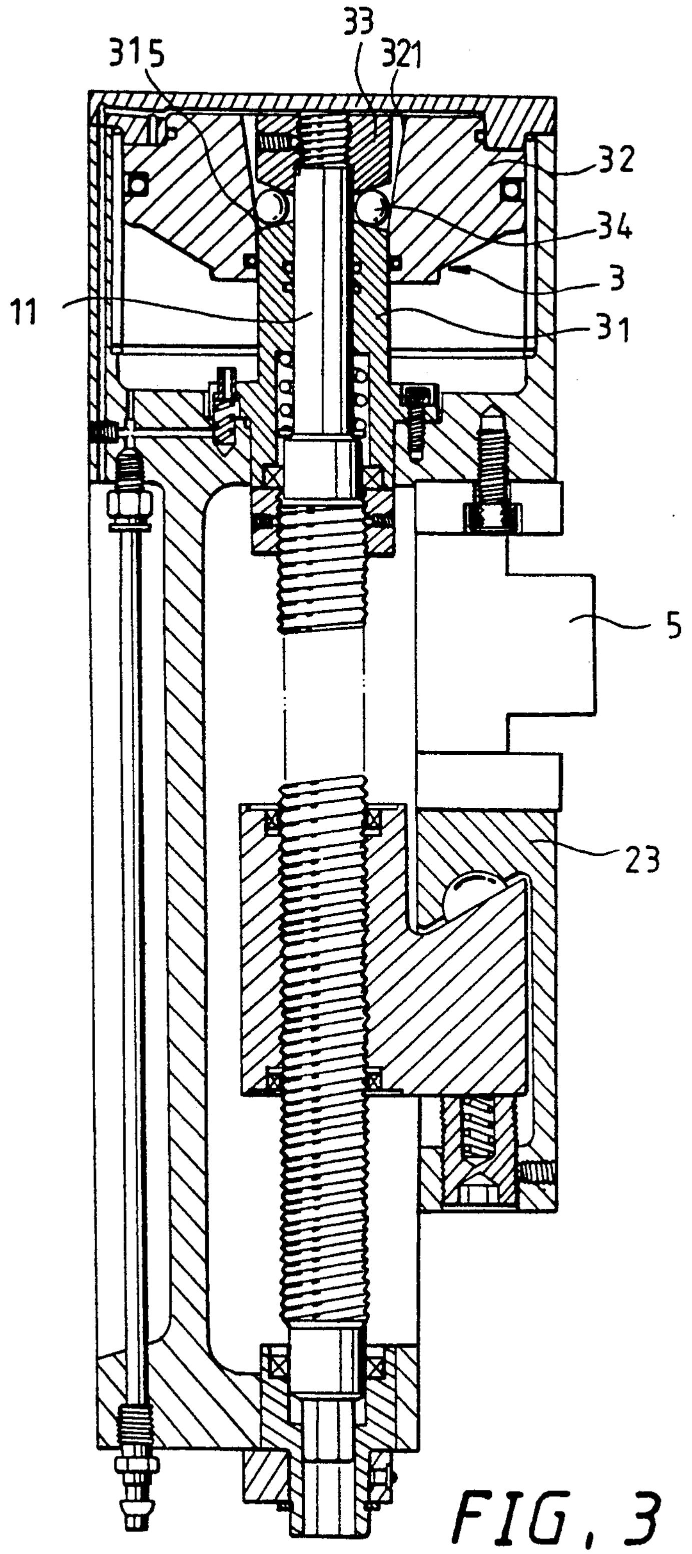
FIG. 3 illustrates operation of the pneumatic booster mechanism according to the present invention.

The pneumatic booster mechanism 3, as shown in FIG. 1, is located within the airtight chamber in the left side of the vise body 1. It is secured to the unthreaded section at the left end of the screw rod 11, by means of a retaining sleeve 31 fixed to the vise body 1 with screws 311 to serve as a support of the screw rod 11 at the left side, and to make a pivot at the reactive side to prevent from upward displacement of working piece when the vise body is subject to a deformation by clamping with an active force and reactive force, and consequently avoid adverse effect to machining precision. The retaining sleeve 31 has a spring 312 in it, an end of which is retained at a stepped portion of the screw rod 11 so that the screw rod 11 is able to return to its original position at the right side. An airtight seal ring 313 and a seal 314 are placed between the retaining sleeve 31 and the screw rod 11 to prevent from air leakage and dust. A taper surface 315 is designed at the left end of the retaining sleeve 31 to correspond to an inner taper surface 321 of a piston 32, and for securing to the right end of booster block taper 33 at the left side of the screw rod 11 to form an annular space, in which a plurality of steel balls 34 are located as shown in FIG. 3. When the piston 32 is displaced leftward, the inner taper surface 321 of the piston 32 forces the steel balls 34 to displace to the center of the screw rod 11. However, because of the taper surface at the left side of the retaining sleeve 31, the steel balls 34 are guided to displace leftward, and consequently the booster block taper 33 forces the screw rod 11 to displace leftward, during which the steel balls 34 serve as a bearing. The leftward displacing force of the screw rod 11 caused by such taper surfaces is greater than the pushing force exerted by the piston 32 by the compressed air pressure. Therefore, the structure described above is a pneumatic booster mechanism 3.

Please refer to FIG. 2 for an assembly of the vise according to the present invention. A rocking handle 4 with a hexagonal head 41 is used to turn the screw rod 11 after inserting the hexagonal head 41 to the hexagonal hole 121 of the handle sleeve 12. By turning of the screw rod 11, the movable jaw 23 is displaced leftward for placing of a working piece 5 between the movable and fixed jaws. Then, by rotating the rocking handle 4, the movable jaw 23 is displaced to approach the working piece 5 till an appropriate gap 6 is formed between the working piece 5 and the movable jaw 23 when the left end of the 5 is held contacting the fixed jaw. The gap 6 must be slightly smaller than the travel of the screw rod 11 by action of the booster mechanism 3. In other words, the gap must be within the travel of the booster mechanism 3 to assure a firm clamping of the working piece 5. Upon connecting the right air passage 17 to a compressed air source, the piston 32 displaces leftward to achieve a clamping effect as shown in FIG. 3. To release the working piece 5, the left air passage 161 is connected to the compressed air source, and then the action of the spring 312 cause the movable jaw 23 to displace and release the working piece 5 promptly. Such a design is particularly suitable for machining of a large quantity of working pieces of the same specifications, and the vice according to the present invention is applicable to different sizes of working pieces, according to the travel of the movable jaw 23.

Figure 4:
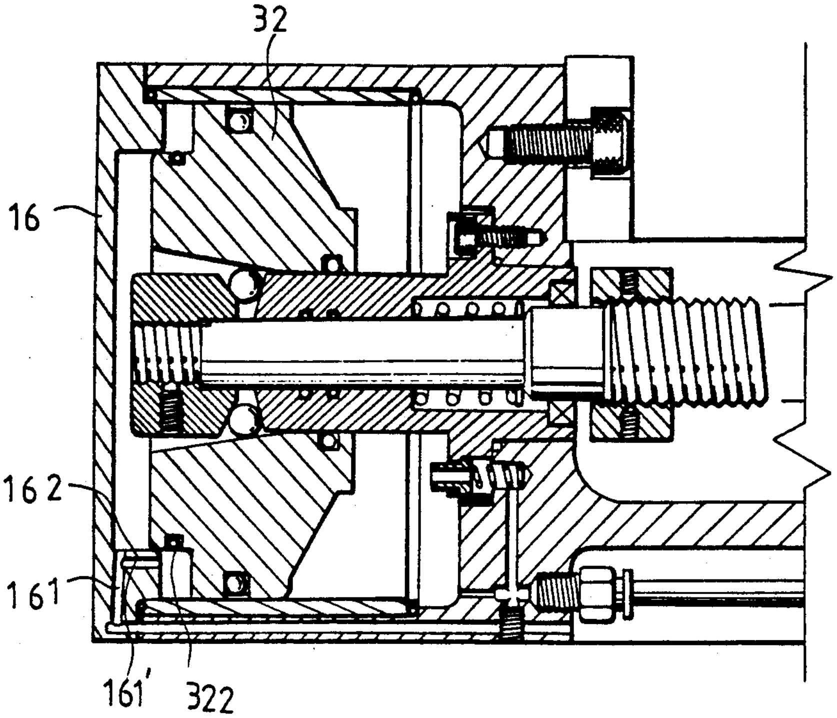
FIG. 4 illustrates an embodiment of a cushion means for the pneumatic booster mechanism according to the present invention.
Figure 5:
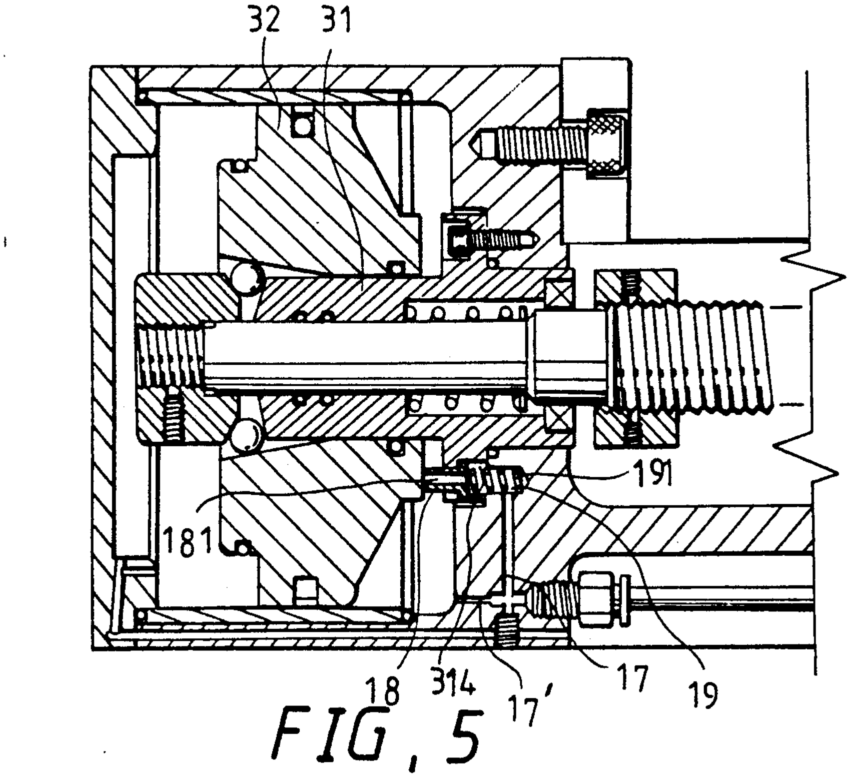
FIG. 5 illustrates another embodiment of the cushion means for the pneumatic booster mechanism according to the present invention.

In view of the large impact brought by fast displacement of the piston 32, each end of the travel of the piston 32 has a cushion to minimize wear and vibration which may adversely affect machining precision. As shown in FIG. 4, the piston 32 has a stepped projection 322 at its right side, and the cover 16 has a corresponding stepped recession 162 just to contain the stepped 322. The air passage 161 is led to the stepped recession 162 of the cover 16, and another air passage 161' of having a inner diameter smaller than that of the air passage 161 is led to the airtight chamber directly so that when the stepped recession 322 is retained within the stepped recession 162, part of the air can only be discharged through the air passage 161' till the piston has reached the left dead point of its travel to provide a damping effect as a cushion. The cushion at the right end of the travel of the piston 32 is shown in FIG. 5. A cushion pad 18 is placed at the junction between the retaining sleeve 31 and the vise body 1. The cushion pad 18 is located within a stepped hole 313 of the retaining sleeve 31, and is pushed out of the hole 314 by a spring 191 at a hole 19 connecting to an air passage 17 so that a part of the cushion pad 18 is exposed at the airtight chamber. The cushion pad 18 has a passing hole 181 so that normally compressed air can pass the passing hole 181 and another air passage 17' having an inner diameter smaller than that of the air passage 17 to and from the airtight chamber. Whenever the piston 32 is displaced rightward so that its right end touches the cushion pad 18, the passing hole 181 is blocked, and the remaining air can be discharged through only the air passage 17' till the piston 32 reaches the right dead point of its travel. The process to discharge the remaining air through the small air passage 17' provides buffer effect.

The pneumatic quick booster type vise described above is characterized by the design of a pneumatic booster mechanism, principle and effect of which is illustrated by an embodiment below with reference to FIG. 6. Please refer to FIG. 6 for a principle of the pneumatic booster mechanism, suppose a: piston's inner conical angle, 8°;

b: retaining sleeve's an outer conical angle, 75°; $\theta_1=30°$, $\theta_2=15°$ c: piston's outer diameter, 125 mm$\phi$;

d: piston's inner diameter, 40 mm$\phi$;

e: double hook angle, 30° f: steel ball's outer diameter, 10 mm$\phi$;
g: compressed air source, 6 kg/cm$^2$;
h: efficiency factor, 75%
i: Spring's tension, 18.5 kg; then
Piston's inner conical angle booster ratio$=1/\sin 8^\circ=7.10$ times.
Piston's cross sectional area
$=\pi D^2/4-\pi d^2/4$
$=\pi (12.5)^2/4-\pi(4)^2/4$
$=122.7-12.56$
$=110.14$ cm$^2$ Gross booster=compressed air pressure$\times$piston's cross section area$\times$piston's inner conical angle booster$\times$retaining sleeve's outer conical angle booster$\times$efficiency factor$\times$Cos (double hook angle)−spring's tension
$=6$ kg/cm$^2\times 110.14$ cm$^2\times 7.10\times(1/\tan 30^\circ+\tan 15^\circ)\times 0.75\times \cos 30^\circ-18.5$ kg
$=3586.6$ kg/f.

The above data proves that the present invention can boost clamping force for an excellent clamping effect.

For fast clamping effect, the screw rod 11 is turned to drive the movable jaw 23 to position at a position corresponding to size of working piece. As the movable jaw 23 is designed with an allowance for displacement upon application of air pressure, the compressed air causes the movable jaw 23 to displace within the allowance to provide a quick clamping effect. An embodiment is described below to illustrate its effect.

Figure 6:
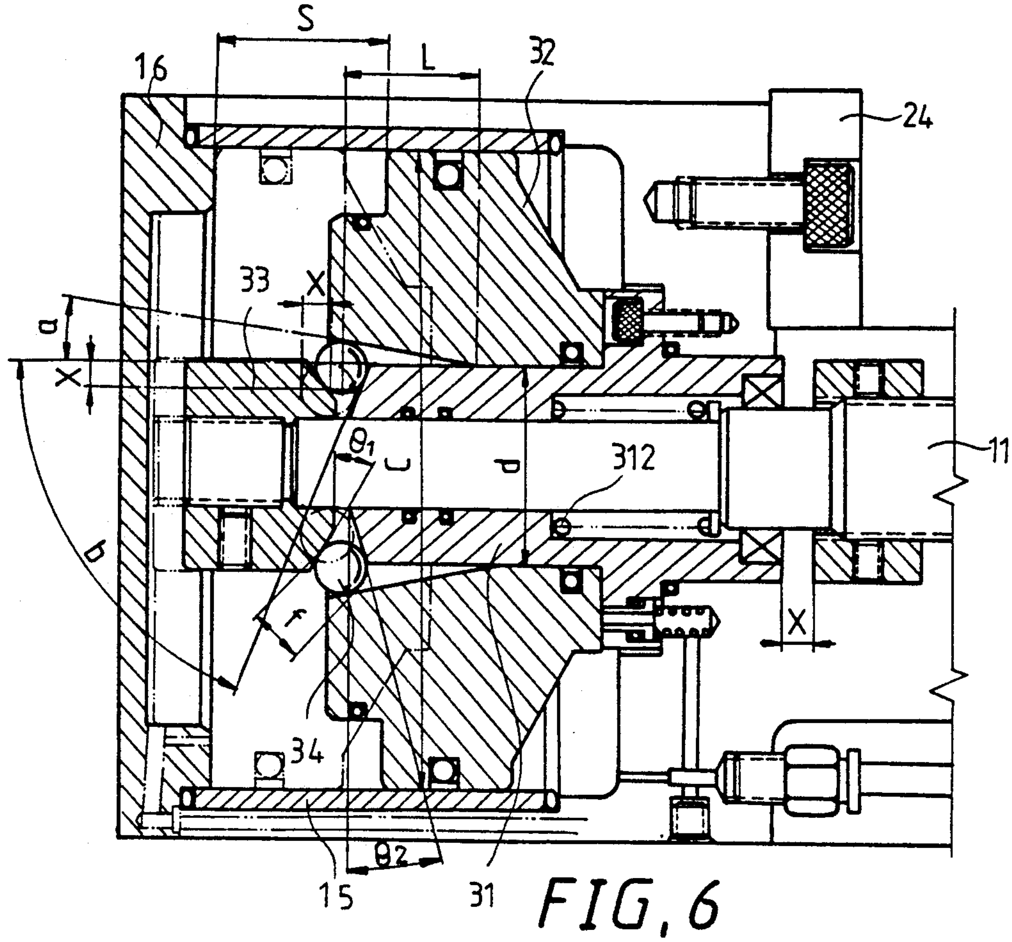
FIG. 6 illustrates an embodiment and principle of the pneumatic booster mechanism according to the present invention.

Please refer to FIG. 6, where the movable jaw's displacement is X, the piston's travel is S, the distance between the steel ball to the slant surface is L, in which S=34 mm, L=32 mm, the steel ball's radius is 10/2 mm, then $$
\begin{aligned}
X &= S/(L+10/2)\times f/2 \\
&= 34/(32+10/2)\times 5 \text{ mm} \\
&= 4.59 \text{ mm.}
\end{aligned}
$$

In other words, upon application of compressed air, the movable jaw 23 displaces for 0–4.59 mm to clamp the working piece. Suppose the size of the working piece is 100 mm, then the movable jaw 23 is adjust to a distance of greater than 100 mm but smaller than 104.59 mm. After placing the working piece between the clamping pads 24 and 24', a compressed air is applied to cause the movable jaw 23 to displace and the booster mechanism to function to clamp the working piece tightly.

Figure 7:
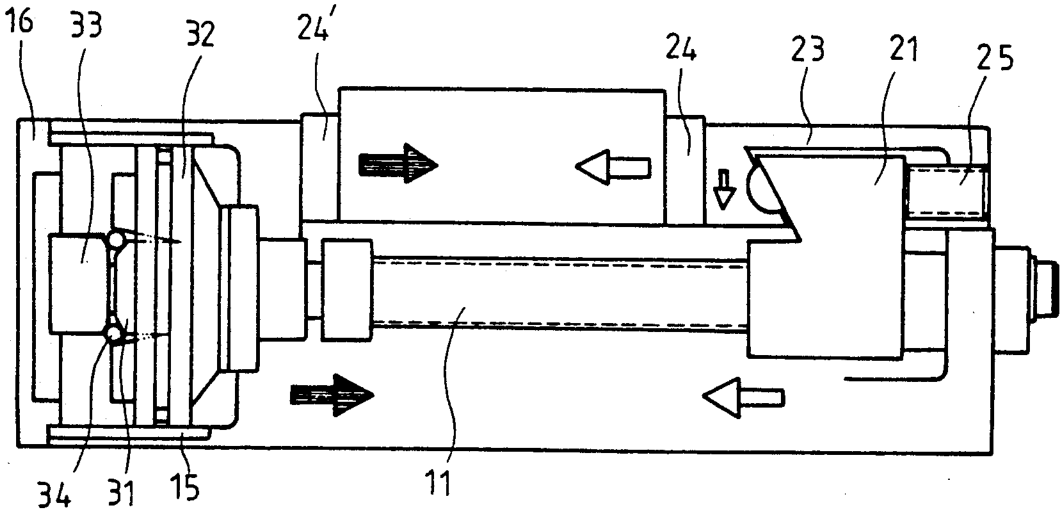
FIG. 7 illustrates active and reactive force at the vise according to the present invention.

The pneumatic quick vise according to the present invention is designed to prevent from uprising of working piece clamped which may affect precise machining as normally seen in the convention vise. In the conventional vise, an active force is applied to hold and clamp working piece with a reactive force. Since the pivot of the active force is mostly the movable jaw. Then, when there is a clamping effect, the working piece tends to raise upwards. In the present invention, the fixed jaw, i.e., the reactive side, serves as a pivot. When there is a clamping effect by the active force and the reactive force, the deformation of the vise body 1 is almost entirely set off and hence, the deformation is minimum, i.e., the tendency of upward raising of the working piece is eliminated, as shown in FIG. 7 which illustrates active force and reactive force at the vise according to the present invention.

I claim:

1. A pneumatic quick vise comprising:

a vise body having first and second longitudinally space end portions, said first end portion including a fixed jaw defined by a hollow structure incorporating a cylinder sleeve having opposing ends each fitted with airtight seal rings, said hollow structure further including a longitudinal opening;

a retaining sleeve fixedly, sealably mounted within said longitudinal opening, said retaining sleeve having a tapered end portion projecting within said hollow structure;

a handle sleeve rotatably mounted in the second end portion of said vise body;

a screw rod having a first end extending through and being rotatably supported by said retaining sleeve and a second end received within said handle sleeve, said screw rod including a threaded portion between said first and second ends, said first end including a stepped portion;

sealing means located between said retainer sleeve and said screw rod such that said hollow structure defines an airtight chamber;

a spring extending between said retaining sleeve and the stepped portion of said screw rod for longitudinally biasing said screw rod in the direction of the second end portion of said vise body;

a booster mechanism located within said airtight chamber, said booster mechanism including a booster block secured to the first end of said screw rod, a piston concentrically, slidably mounted about said retaining sleeve so as to divide said airtight chamber into sub-chambers located on either side of said piston, a plurality of balls and means for selectively pressurizing and de-pressurizing and sub-chambers, said booster block including a tapered end portion juxtapose the tapered end portion of said retaining sleeve, said piston including a tapered surface, said plurality of balls being wedged into an annular space defined between the tapered end portion of said retaining sleeve, the tapered end portion of said booster block and the tapered surface of said piston;

a locker mechanism including a jaw body formed with a longitudinally extending threaded bore threadably engaged with the threaded portion of said screw rod, first and second, longitudinally spaced seal members for sealing said jaw body against said screw rod to prevent the invasion of dust therebetween, a movable jaw and a setting assembly, said jaw body including a slanted surface portion having a semi-spherical segment, said movable jaw extending about a portion of said jaw body and including a slanted surface portion juxtaposed to the slated surface portion of said jaw body and a recess receiving said semi-spherical segment, said setting assembly including a setting member extending between said jaw body and said movable jaw and a spring extending between said setting member and said jaw body, said setting assembly functioning to maintain said movable jaw on said jaw body with said semi-spherical segment located within said recess; and a rocking handle adapted to engage said handle sleeve for rotating said handle sleeve and said screw rod, wherein said movable jaw can be longitudinally shifted relative to said fixed jaw by rotating said screw rod through said rocking handle and by selectively adjusting the relative pressures within said sub-chambers by said pressurizing means so as to shift said piston and to cause longitudinal movement of said screw rod by displacing said booster block, against the biasing force of the spring extending between said retaining sleeve and said screw rod, by wedging of said plurality of balls into and out of said annular space.

2. A pneumatic quick vise as claimed in claim 1 wherein the movable jaw of the locker mechanism is displaced toward said fixed jaw for clamping action by the screw rod driven by the piston of the pneumatic booster mechanism.

3. A pneumatic quick vise as claimed in claim 1 wherein the movable jaw is shiftable to permit clamping and releasing of a working piece by turning of the screw rod directly or by operation of the piston by said pressurizing means.

4. A pneumatic quick vise as claimed in claim 1 wherein the booster mechanism is incorporated with a first cushion means comprising a stepped projection formed in said piston and a corresponding stepped recession formed within said hollow structure, a first large air passage is led to stepped recession and a first small air passage is led to the airtight chamber directly so that when the stepped projection is retained within the stepped recession, part of the air can only be discharged through the first small air passage till the piston has reached a first dead point of its travel to provide a damping effect as a cushion; a second cushion means is placed at the junction between the retaining sleeve and the vise body and includes a cushion member located within a stepped hole of the retaining sleeve and a spring located in said stepped hole being connected to a second large air passage so that a part of the cushion member is exposed at the airtight chamber, said cushion member having a passing hole so that normally compressed air can pass through the passing hole and a second small air passage to and from the airtight chamber and hence, when the piston is displaced till it engages the cushion member, the passing hole is blocked, and the remaining air can be discharged through only the second small air passage until the piston reaches a second dead point of its travel.

* * * * *